United States Patent [19]

Christ

[11] 4,114,959
[45] Sep. 19, 1978

[54] HYDROSTATIC SUPPORTING DEVICE INCLUDING BEARING SHOE

[75] Inventor: Alfred Christ, Zurich, Switzerland

[73] Assignee: Escher Wyss Limited, Zurich, Switzerland

[21] Appl. No.: 813,550

[22] Filed: Jul. 7, 1977

[30] Foreign Application Priority Data

Jul. 14, 1976 [CH] Switzerland .................. 009005/76

[51] Int. Cl.² ........................................... F16C 17/00
[52] U.S. Cl. ................................ 308/3.5; 29/116 AD; 308/5 R; 308/9
[58] Field of Search ............... 308/5 R, 5 V, 3 R, 78, 308/DIG. 1, 3 A, 3.5, 3 C, 73, 168, 170, 172, 160, 122, 9, 4 C, 4, 121, 135; 29/116 AD, 113 AD; 417/900

[56] References Cited

U.S. PATENT DOCUMENTS

| | | | |
|---|---|---|---|
| 3,744,858 | 7/1973 | Weichsel | 308/DIG. 1 |
| 3,753,604 | 8/1973 | Arsenius | 308/160 |
| 3,799,628 | 3/1974 | Van Gaasbeek et al. | 308/5 R |
| 3,802,044 | 4/1974 | Spillmann et al. | 29/113 AD |

FOREIGN PATENT DOCUMENTS

| | | | |
|---|---|---|---|
| 541,088 | 10/1973 | Switzerland | 308/5 R |
| 560,334 | 3/1975 | Switzerland | 308/5 R |

*Primary Examiner*—Trygve M. Blix
*Assistant Examiner*—Douglas C. Butler
*Attorney, Agent, or Firm*—Robert A. Ostmann

[57] ABSTRACT

A hydrostatic supporting device with a bearing shoe having a hydrostatic bearing pocket directed towards the sliding surface of the supported part, and with a hydraulic servomechanism between the bearing shoe and the foundation, characterized in that at the front side of the bearing shoe, looking in the direction of movement of the sliding surface, there is arranged at or in the ledge of the bearing pocket a channel which is open towards the sliding surface and is supplied with an additional pressure medium.

5 Claims, 5 Drawing Figures

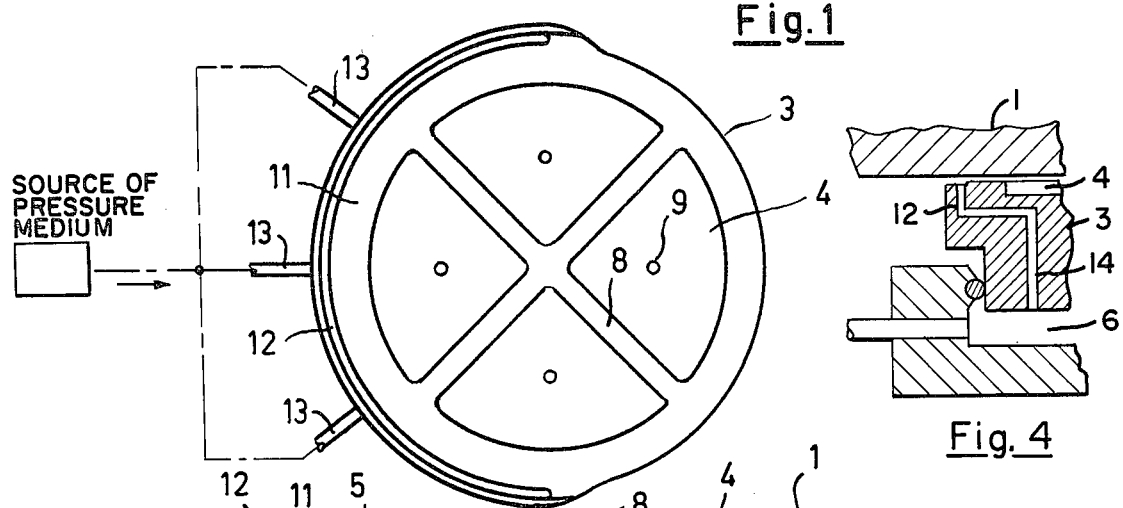
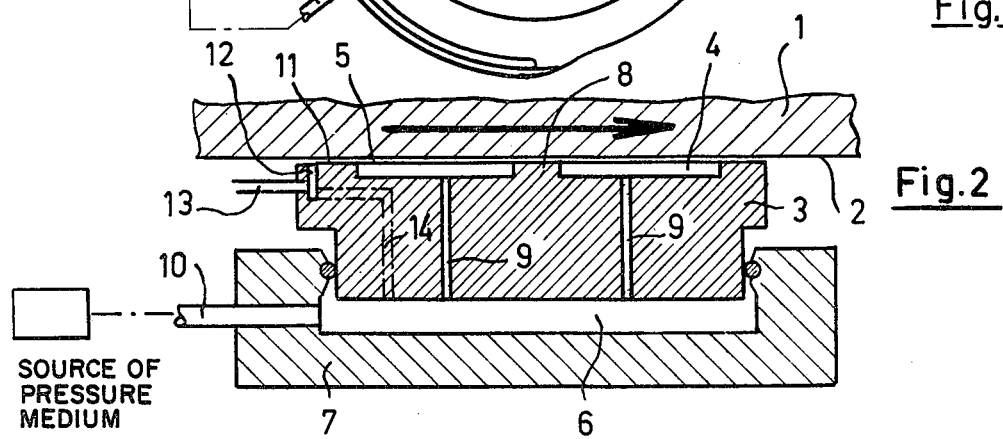
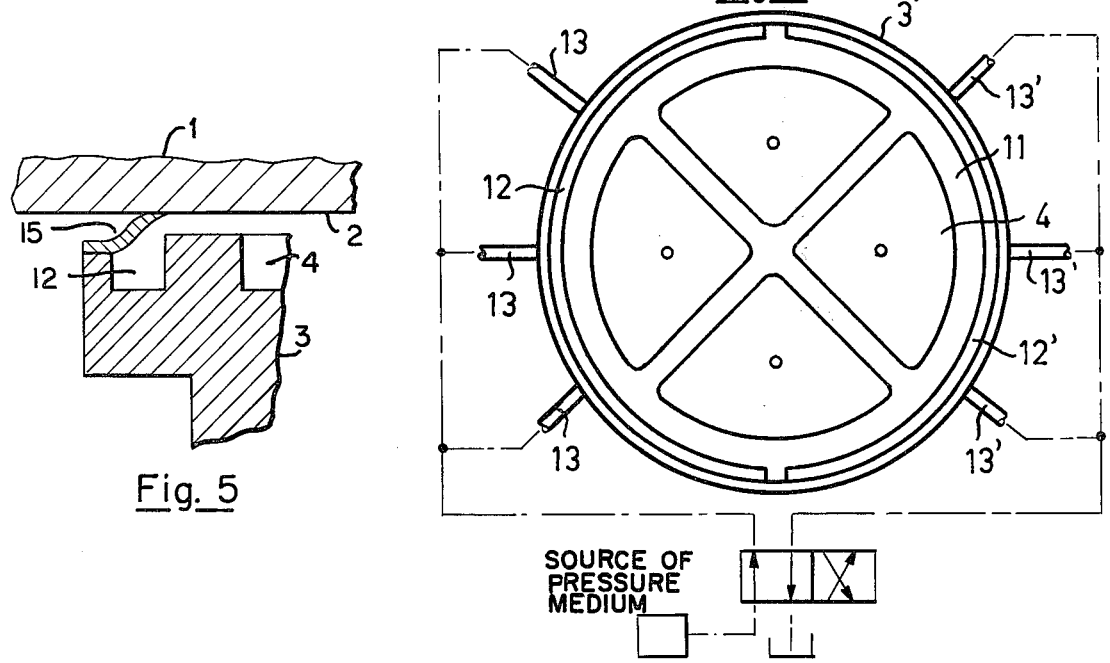

HYDROSTATIC SUPPORTING DEVICE INCLUDING BEARING SHOE

BACKGROUND OF THE INVENTION

The invention relates to a hydrostatic supporting device for a movable part which is to be supported and which comprises a sliding surface, the supporting device having a bearing shoe and a hydrostatic bearing pocket at the supporting surface of the bearing shoe and a ledge confining the bearing pocket, and having a hydraulic servomechanism between the bearing shoe and the foundation, the bearing pocket of the bearing shoe and/or the pressure chamber of the servomechanism being connectable to a pressure medium source.

A hydrostatic supporting device of this kind is known from Swiss Pat. No. 541 088 and Swiss Pat. No. 560 334. In this hydrostatic supporting device, the movable part being supported is supported by the pressure medium conveyed into the bearing pocket, and pressure medium flows out over the ledge of the pocket through the gap between the sliding surface of the part being supported and the supporting surface of the bearing shoe. Except for the region of the aforesaid ledge there is a floating friction situation, so that the supporting device operates with extremely small friction values. In the case of very high speeds of the sliding surface relatively to the hearing shoe it may happen that the bearing shoe will become skewed or that even metal to metal contact may occur between the bearing shoe and the sliding surface.

SUMMARY OF THE INVENTION

The invention has as its object to provide a hydrostatic supporting device which operates in a satisfactory manner even at very high speeds.

In a hydrostatic supporting device of the type initially described, this object is achieved according to the invention in that a channel open towards the sliding surface is arranged at the front side of the bearing shoe, looking in the direction of movement of the sliding surface, at or in the ledge of the bearing pocket, and that this channel is supplied with an additional pressure medium.

The invention is based on the new knowledge that when the part being supported moves at a very high speed relatively to the bearing shoe, the speed imposed on the pressure medium by the relative movement of the sliding surface and the bearing shoe is greater than the speed of the pressure medium issuing through the gap between the sliding surface and the ledge of the bearing shoe. The front part of the ledge of the bearing shoe, looking in the direction of movement of the sliding surface, is then no longer supplied sufficiently with pressure medium. By introducing additional pressure medium as proposed by the invention for the part of the ledge of the bearing pocket situated at the front side of the bearing shoe, however, a satisfactory supply is ensured for the front part of the ledge also, and therefore the entire ledge of the bearing shoe.

An advantageous further development of the invention consists in that at the rear side of the bearing shoe also there is arranged at or in the ledge of the bearing pocket a channel which is open towards the sliding surface and is connectable to a pressure medium well.

More particularly for the channel arranged at the front side of the bearing shoe it is advantageous if that ledge of the channel which is remote from the bearing pocket is spaced at a greater distance from the sliding surface than the ledge of the bearing pocket.

If the direction of movement of the sliding surface has to be capable of being reversed, it is advantageous to arrange a channel at each of the two sides of the bearing shoe and to arrange these two channels to be capable of being alternatively supplied with additional pressure medium or connectable to a pressure medium well.

BRIEF DESCRIPTION OF THE DRAWING

Constructional examples of the subject of the invention are shown in a simplified manner in the drawings by means of which the invention will be explained in more detail. In these drawings:

FIG. 1 shows a view onto the supporting surface of a bearing shoe,

FIG. 2 shows a vertical axial section through the bearing shoe of FIG. 1,

FIG. 3 shows a view onto the supporting surface of a further bearing shoe,

FIG. 4 is a partial vertical axial section through the bearing shoe showing an alternative way of supplying pressure medium to the channel, and FIG. 5 is an enlarged, partial vertical axial section through the bearing shoe showing a lip seal for the channel.

DESCRIPTION OF THE PREFERRED EMBODIMENTS

The hydrostatic supporting device shown in FIG. 1 and 2 is used for supporting a mobile part 1 comprising a sliding surface 2. A bearing shoe 3 with a hydrostatic bearing pocket 4 arranged at a supporting surface 5 of the bearing shoe 3 and directed towards the sliding surface 2 forms, together with a foundation 7, a hydraulic servomechanism 6.

The bearing pocket 4 of the bearing shoe 2 is divided by partitions 8 into four compartments which are arranged in succession to one another in the peripheral direction and each of which receives pressure medium from the pressure chamber of the servomechanism 6 by way of its own throttling duct 9. The servomechanism 6 is connected to a pressure medium source by means of a supply conduit 10.

However, each of the compartments of the bearing pocket 4 could also be connected directly by means of its own supply conduit, provided with a throttling element, to the pressure medium source, and in that case the pressure chamber of the servomechanism 6 would be supplied with pressure medium through the throttling duct 9. It would also be possible to connect both the bearing pocket 4 of the bearing shoe 3 and also the pressure chamber of the servomechanism 6 directly to a pressure medium source. The bearing pocket 4 is confined by a ledge 11.

The direction of movement of the sliding surface 2 relatively to the bearing shoe 3 is designated by means of an arrow in the drawings. At the front side of the bearing shoe 3, looking in the direction of movement of the sliding surface 2, there is arranged at the ledge 11 of the bearing pocket 4 a channel 12 which is open towards the sliding surface 2. The channel 12 is supplied with an additional pressure medium by way of three conduits 13.

Instead of being supplied by way of the conduits 13 the channel 12 could also be supplied by way of a duct 14 indicated in FIG. 4 (if appropriate a plurality of such ducts 14) with additional pressure medium. The throttling effect of the ducts 14 should then be so considerable that no more pressure medium flows into the channel 12 than is carried along into the gap between the ledge 11 and the sliding surface 2. In the hydrostatic supporting device shown in FIG. 3, the bearing shoe 3' is provided with two similar channels 12 and 12' located, respectively, at the opposite sides of the shoe along the path of movement of the part which is to be supported. If the supported part always moves from left to right, channel 12 is supplied with pressure medium through conduits 13, and channel 12' is connected by conduits 13' with a pressure medium well. On the other hand, if the direction of movement of the supported part may be reversed, the apparatus, as indicated in FIG. 3, includes selecting means for supplying pressure medium to whichever of the channels 12 and 12' is at the front side of the shoe and for connecting the other channel with the pressure medium well.

Therefore, this supporting device can operate in a satisfactory manner in both directions of movement even when the sliding surface moves at high speed relatively to the bearing shoe.

As FIG. 2 shows more particularly, that ledge of the channel 12 which is remote from the bearing pocket is spaced at a greater distance from the sliding surface 2 than the ledge 11 of the bearing pocket, and as a result a clearance is always reliably provided between said remote ledge and the sliding surface.

The gap between the ledge remote from the bearing pocket on the one hand and the sliding surface 2 on the other hand may be sealed by a lip 15, which, as shown in FIG. 5, is directed towards the channel space and abuts on the sliding surface 2.

The invention is illustrated with reference to a floating bearing wherein the supporting force remains of the same magnitude at all heights of the bearing shoe, but it may also be used in other supporting devices of the type initially described, for example devices wherein the bearing force varies with the bearing shoe movements in the height direction. The invention may also be used in supporting devices of the type initially described which are constructed as sealing devices or as pressure medium application devices.

I claim:

1. In hydrostatic supporting apparatus for supporting a mobile part which moves relatively to a foundation and which comprises a bearing shoe mounted in the foundation and having a supporting surface which faces a sliding surface of the mobile part and defines therewith a bearing gap, a hydraulic servomotor arranged to urge the shoe toward the mobile part, a bearing pocket formed in the supporting surface of the shoe and which is confined by a ledge, and means for delivering pressure medium to the servomotor and the bearing pocket, and wherein the shoe has front and rear ledge portions at its opposite sides in the direction of movement of the mobile part, the improvement which comprises means defining a channel at the front ledge portion which opens towards the sliding surface; and means for delivering pressure medium to the channel, the channel serving to direct pressure medium into the region of the bearing gap located between the sliding surface and the front ledge portion.

2. Hydrostatic supporting apparatus as defined in claim 1 which includes means defining a second channel which opens toward the sliding surface and is located at the rear ledge portion; and a pressure medium well connected with the second channel, whereby pressure medium in the region of the bearing gap located between the sliding surface and the rear ledge portion is conveyed to the well via the second channel.

3. Hydrostatic supporting apparatus as defined in claim 2 wherein the direction of movement of the mobile part can be reversed; and which includes means for selectively delivering pressure medium to either one of the channels and connecting the other of the channels with the pressure medium well.

4. Hydrostatic supporting apparatus as defined in claim 1 in which the channel is bounded at its front side, in the direction of movement of the mobile part, by a ledge part which is spaced at a greater distance from the sliding surface than said ledge which confines the bearing pocket.

5. Hydrostatic supporting apparatus as defined in claim 4 which includes a sealing lip at said ledge part which is directed toward the channel and abuts the sliding surface.

* * * * *